United States Patent
Whitehurst et al.

(10) Patent No.: US 10,036,261 B2
(45) Date of Patent: Jul. 31, 2018

(54) BLADE DOVETAIL BOTTOM

(75) Inventors: Sean A. Whitehurst, South Windsor, CT (US); Christopher S. McKaveney, Rocky Hill, CT (US); Patrick James McComb, Naugatuck, CT (US)

(73) Assignee: United Technologies Corporation, Farmington, CT (US)

( * ) Notice: Subject to any disclaimer, the term of this patent is extended or adjusted under 35 U.S.C. 154(b) by 1752 days.

(21) Appl. No.: 13/459,748

(22) Filed: Apr. 30, 2012

(65) Prior Publication Data

US 2013/0287578 A1 Oct. 31, 2013

(51) Int. Cl.
  *F03B 3/12* (2006.01)
  *F01D 5/30* (2006.01)
  *F04D 29/32* (2006.01)

(52) U.S. Cl.
  CPC ......... *F01D 5/3007* (2013.01); *F04D 29/322* (2013.01); *F05D 2220/36* (2013.01); *F05D 2250/711* (2013.01)

(58) Field of Classification Search
  CPC .................................................... F01D 5/3007
  USPC ................... 416/2, 219 R, 220 R, 221, 248; 415/122.1, 124.2
  See application file for complete search history.

(56) References Cited

U.S. PATENT DOCUMENTS

| 3,970,412 | A | | 7/1976 | Sundt |
| 4,175,912 | A | * | 11/1979 | Crane ........................ F01D 5/22 416/134 R |
| 5,067,876 | A | | 11/1991 | Moreman, III |
| 5,161,949 | A | * | 11/1992 | Brioude ..................... F01D 5/22 416/193 A |
| 5,443,365 | A | | 8/1995 | Ingling et al. |
| 5,474,423 | A | | 12/1995 | Seeley et al. |
| 5,573,377 | A | | 11/1996 | Bond et al. |
| 5,846,054 | A | | 12/1998 | Mannava et al. |
| 6,030,178 | A | | 2/2000 | Caruso |
| 6,132,175 | A | * | 10/2000 | Cai et al. .................. 416/220 R |
| 6,168,382 | B1 | | 1/2001 | Nolan et al. |
| 6,832,896 | B1 | * | 12/2004 | Goga ..................... F01D 5/3007 416/191 |
| 6,840,740 | B2 | | 1/2005 | Yehle et al. |
| 7,931,442 | B1 | * | 4/2011 | Liang ........................ 416/193 A |
| 8,047,796 | B2 | | 11/2011 | Riaz et al. |

(Continued)

FOREIGN PATENT DOCUMENTS

DE   102007050916 A1   4/2008

OTHER PUBLICATIONS

International Preliminary Report on Patentability for International Application No. PCT/US2013/038573 dated Nov. 13, 2014.

(Continued)

*Primary Examiner* — Jason Shanske
*Assistant Examiner* — Jason Mikus
(74) *Attorney, Agent, or Firm* — Carlson, Gaskey & Olds, P.C.

(57) ABSTRACT

A blade has an airfoil extending radially outwardly of a dovetail. The dovetail has edges that will be at circumferential sides of the blade when the blade is mounted within a rotor. A bottom surface of the dovetail will be radially inward when the rotor blade is mounted in a rotor, and is formed such that a circumferentially central portion of the bottom surface is radially thicker than are circumferential edges. A fan and a gas turbine engine are also described.

3 Claims, 3 Drawing Sheets

(56) References Cited

U.S. PATENT DOCUMENTS

| | | | |
|---|---|---|---|
| 2004/0076523 A1 | 4/2004 | Sinha et al. | |
| 2004/0241001 A1* | 12/2004 | DiBella | 416/219 R |
| 2010/0092295 A1 | 4/2010 | Riaz et al. | |
| 2010/0166561 A1 | 7/2010 | Boyer | |
| 2012/0251328 A1* | 10/2012 | Connor | F01D 5/3007 |
| | | | 416/219 R |
| 2013/0195624 A1* | 8/2013 | Schwarz et al. | 415/122.1 |

OTHER PUBLICATIONS

International Search Report and Written Opinion for International Application No. PCT/US2013/038573 completed on Feb. 6, 2014.
Singapore Search Report for Singapore Patent Application No. 11201406237S dated Sep. 18, 2015.
Supplementary European Search Report for European Application No. 13819420.4 dated Apr. 29, 2016.

* cited by examiner

BLADE DOVETAIL BOTTOM

BACKGROUND OF THE INVENTION

This application relates to a blade dovetail for a gas turbine engine.

Gas turbine engines may be provided with a fan for delivering air to a compressor section. From the compressor section, the air is compressed and delivered into a combustion section. The combustion section mixes fuel with the air and burns the combination. Products of the combustion pass downstream over turbine rotors which are driven to rotate and in turn rotate the compressor and fan.

The fan may include a rotor having a plurality of blades.

One type of fan blade is a generally hollow fan blade comprised of two or more pieces. The blades are subject to a number of challenges, including internal stresses that vary along the length of the fan blade.

Known fan blades typically include an airfoil extending radially outwardly of a portion known as a dovetail. The dovetail sits within a slot in the rotor. As the fan rotates, centrifugal force urges the blade radially outwardly. As this occurs, the dovetail is urged against surfaces of the rotor. In instances where the rotor is formed of a stronger material than the dovetail, this can result in the circumferential edges of the dovetail bending downwardly, and bowing a bottom surface of the dovetail upwardly. Known dovetails have had a relatively flat bottom, and this can result in distortion of the dovetail when under load.

Historically, the fan rotor has been driven by a direct connection to a turbine section. However, more recently, a gear reduction has been incorporated between the turbine section and the fan rotor. The turbine section allows the fan to rotate at slower speeds relative to the turbine. With the change in the fan speed, it has been possible to make the fan blades larger. The distortion above can increase as the fan blade becomes larger.

SUMMARY OF THE INVENTION

In one embodiment, a blade has an airfoil extending radially outwardly of a dovetail. The dovetail has edges that will be at circumferential sides of the blade when the blade is mounted within a rotor. A bottom surface of the dovetail is radially inward when the rotor blade is mounted in a rotor. The bottom surface is formed such that a circumferentially central portion of the bottom surface is radially thicker than are circumferential edges.

In another embodiment according to the previous embodiment, the bottom surface increases generally constantly from the circumferential edges to the central portion.

In another embodiment according to any of the previous embodiments, the bottom surface is formed on a curve.

In another embodiment according to any of the previous embodiments, the bottom surface is convex.

In another embodiment according to any of the previous embodiments, the dovetail is formed of a material that is less strong than the rotor which will receive said blade.

In another embodiment according to any of the previous embodiments, the airfoil extends from a leading edge to a trailing edge, and has suction and pressure sides. The circumferential edges of the blade are generally associated with the suction and pressure sides.

In another embodiment according to any of the previous embodiments, the central portion is at a circumferential center of the dovetail.

In another embodiment according to any of the previous embodiments, the blade is a fan blade.

In another featured embodiment, a fan has a fan rotor with a plurality of slots. The slots each receive a fan blade. The fan blades include an airfoil extending radially outwardly of a dovetail. The dovetail has edges at circumferential sides of the blade. A bottom surface of the dovetail is defined at a radially inward location. The bottom surface is formed such that a circumferentially central portion of the bottom surface is radially thicker than are circumferential edges.

In another embodiment according to the previous embodiment, the bottom surface increases generally constantly from the circumferential edges to the central portion.

In another embodiment according to any of the previous embodiments, the bottom surface is formed on a curve.

In another embodiment according to any of the previous embodiments, the bottom surface is convex.

In another embodiment according to any of the previous embodiments, the dovetail is formed of a material that is less strong than a material forming the rotor.

In another featured embodiment, a gas turbine engine has a fan configured to deliver air into a compressor section, a combustion section and a turbine section. The fan has a fan rotor with a plurality of slots. The slots receive a fan blade, which includes an airfoil extending radially outwardly of a dovetail. The dovetail has edges at circumferential sides of the blade. A bottom surface of the dovetail is defined at an inward location. The bottom surface is formed such that a circumferentially central portion of the bottom surface is radially thicker than are circumferential edges.

In another embodiment according to any of the previous embodiments, the bottom surface increases generally constantly from the circumferential edges to the central portion.

In another embodiment according to any of the previous embodiments, the bottom surface is formed on a curve.

In another embodiment according to any of the previous embodiments, the bottom surface is convex.

In another embodiment according to any of the previous embodiments, the dovetail is formed of a material that is less strong than the material forming the rotor.

In another embodiment according to any of the previous embodiments, the airfoil extends from a leading edge to a trailing edge, and has suction and pressure sides. The circumferential edges of the fan blade extend along the suction and pressure sides.

These and other features of the invention will be better understood from the following specification and drawings, the following of which is a brief description.

DETAILED DESCRIPTION

Figure 1:
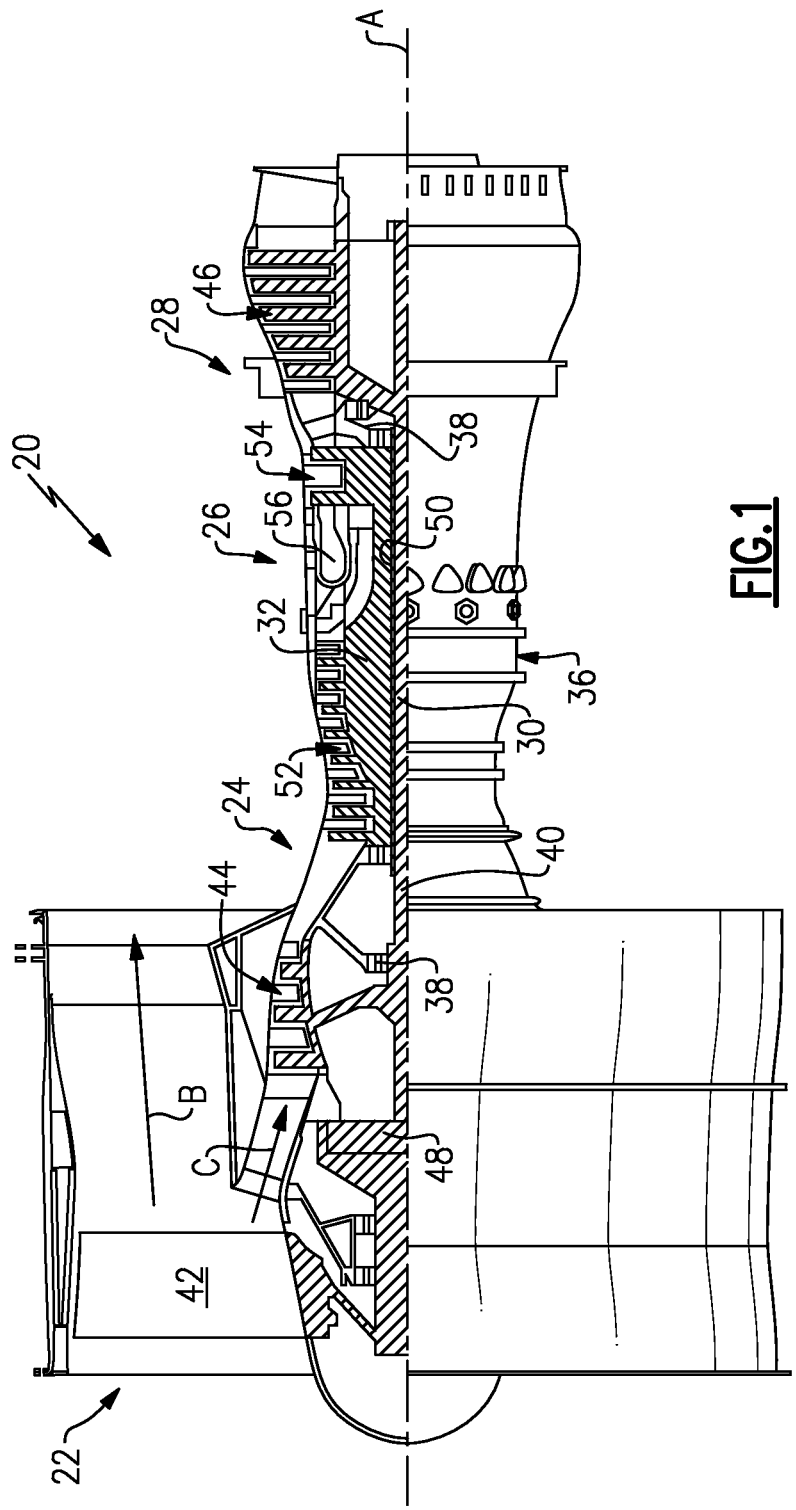
FIG. 1 shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include a third spool, an augmentor section (not shown) among other systems or features. The fan section 22 drives air along a bypass flowpath while the compressor section 24 drives air along a core flowpath C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFCT')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tambient deg R)/518.7)ˆ0.5]. The "Low corrected fan tip speed" as disclosed herein according to one non-limiting embodiment is less than about 1150 ft/second.

Figure 2A:
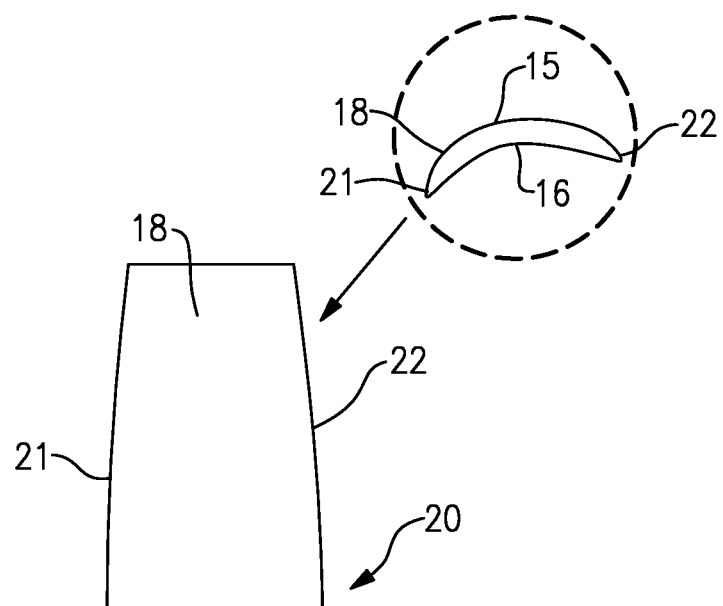
FIG. 2A shows a known rotor blade.
Figure 2A:
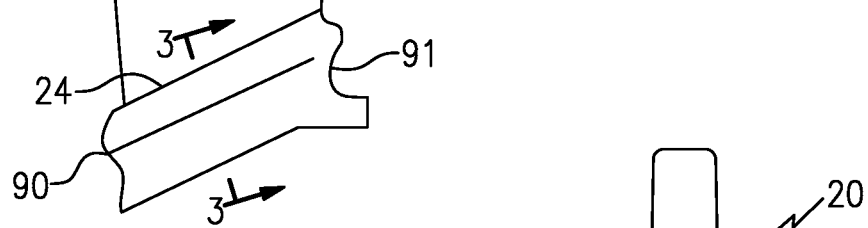

A fan blade 20 is illustrated in FIG. 2A having an airfoil 18 extending radially outwardly from a dovetail 24. A leading edge 21 and a trailing edge 22 define the forward and rear limits of the airfoil 18. As known, the airfoil portion 18 has a suction side 15 and a pressure side 16. Ends 90 and 91 of the dovetail 24 can be seen to be relatively complex. These ends are typically found at ends of the overall blade 20 associated with the leading edge 21 and trailing edge 22.

Figure 2B:
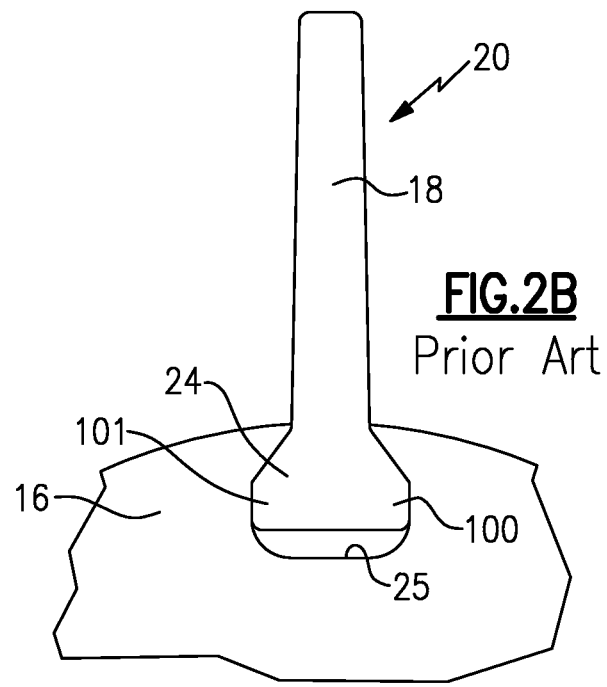
FIG. 2B is another view of the FIG. 2A rotor blade.

As shown in FIG. 2B, a fan rotor 16 receives the dovetail 24 in slot 25, shown schematically, to mount the fan blade with the airfoil 18 extending radially outwardly. As the rotor is driven to rotate, it carries the fan blade 20 with it. There are higher stresses in fan blade 20 adjacent to the rotor 16 than occur radially outwardly. Higher stresses can also occur on and near the boundary of the contact between the fan blade 20 and the rotor 16. As can be appreciated, circumferential edges 100 and 101 are associated with the dovetail 24. As is clear from the Figures, in the disclosed fan blade, the dovetail 24 merges directly into the airfoil 18 without an intermediate platform.

The dovetail 24 sits within a slot 25 in the rotor 16. The circumferential edges 100 and 101 abut surfaces of the rotor 16 at the edges of the slot 25. As can be appreciated, the edges 100 and 101 are generally associated with the suction and pressure sides of the airfoil.

Figure 3:
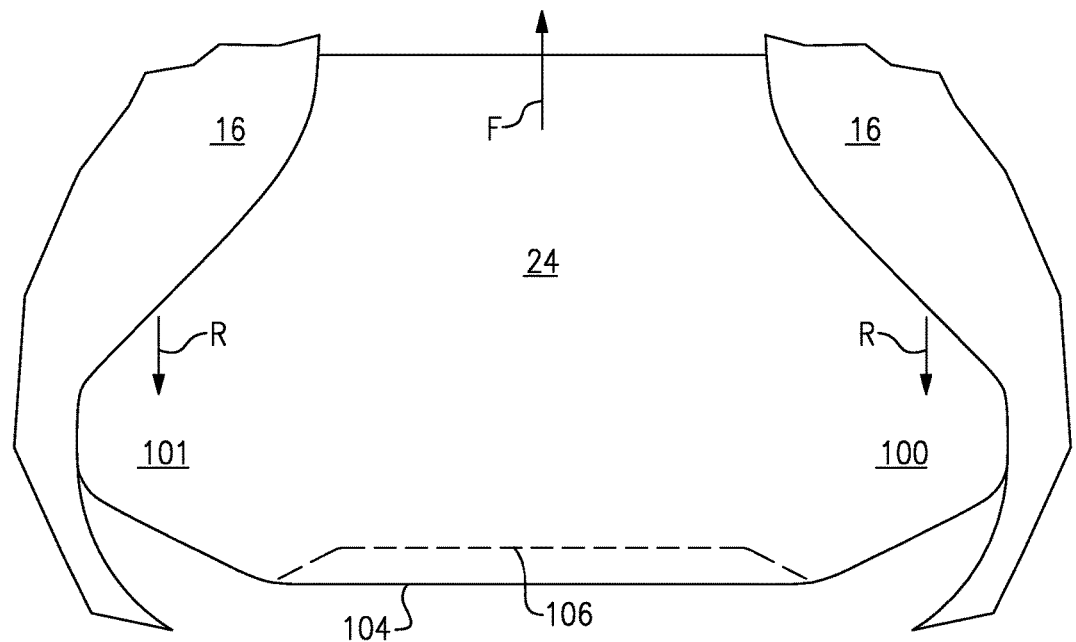
FIG. 3 shows a problem that occurs with prior art dovetails.

FIG. 3 shows a feature with the known dovetails 24 that can be improved. As shown, a bottom surface 104 is relatively flat. When under load, a centrifugal force F urges the dovetail 24 radially outwardly. This results in the circumferential edges 100 and 101 abutting surfaces of the rotor 16, and a reaction force R forcing the edges 100 and 101 radially inwardly. This causes the flat surface 104 to distort or bow upwardly as shown at 106. The amount of bowing is exaggerated for illustration purposes. This bowing increases stresses in of the blade incorporating this dovetail 24. Also, the bowing can affect the blade if the blade is impacted, such as in a bird strike. Notably, the prior art as shown in FIG. 3, and the illustrated problem, generally occurs when a material forming the rotor 16 is stronger than the material forming the blade 20. Of course both components may include any number of materials, but the main material forming the dovetail may be less strong than the main material forming the rotor surfaces that contact the dovetail.

Figure 4:
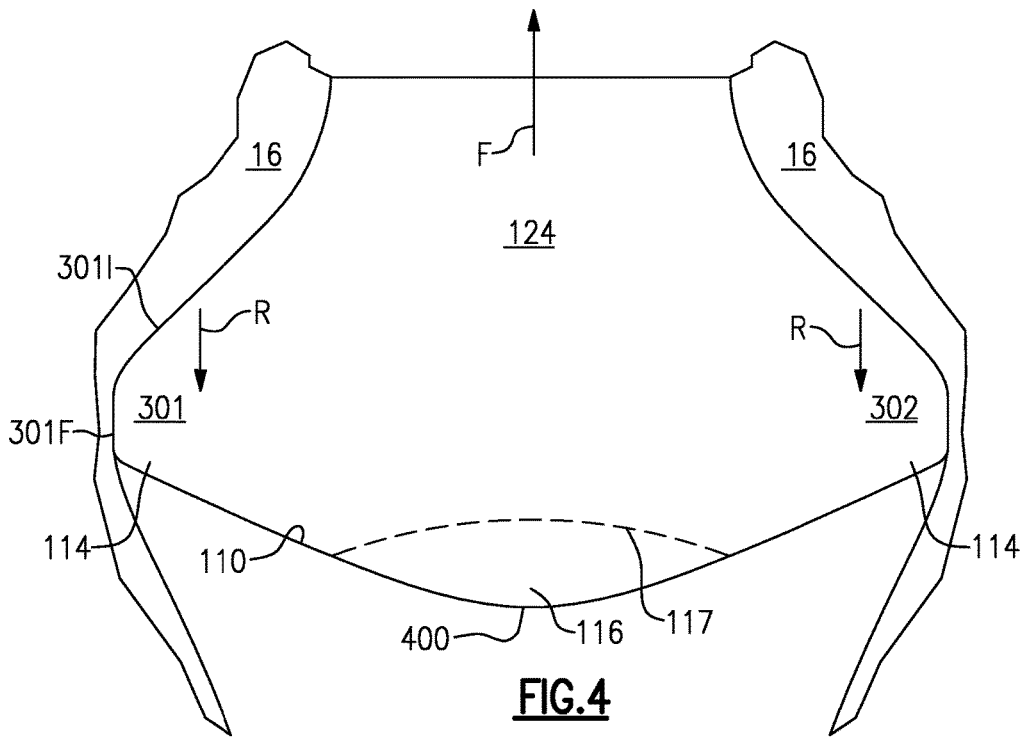
FIG. 4 shows a new dovetail.

FIG. 4 shows a novel dovetail 124. Dovetail 124 still sees the centrifugal force F as mentioned above. There are still reaction forces R associated with the edges 301 and 302. However, the bottom surface 110 is convex. That is, it is formed along a curve, such that circumferential edges 114 of the bottom 110 are relatively thinner than a central portion 116. The distorted or bowed upward movement (similar to that shown at 106 in FIG. 3) is illustrated at 117 in FIG. 4. The dovetail shape can be seen to have the curved bottom surface 110 merging into relatively radially outwardly extending surfaces 301F, and then inwardly extending surfaces 301I.

While a convex or curved surface 110 is disclosed, it is possible to achieve similar benefits with a triangular surface, or some other constantly increasing surface, which increases until reaching a circumferentially central point 400. That is, there may be other shapes which provide a dovetail bottom surface wherein the central portion extends further radially inwardly than do the circumferential edges of the dovetail.

While the surface may increase to a largest point at the center, the largest point may be spaced closer to one edge. However, that largest point would still be "central" in that it will be spaced towards the center from the most adjacent edge.

While the application discloses a fan blade, there may be benefits in other blades using such a dovetail. As an example compressor blades or turbine blades for gas turbine engine applications may use such a dovetail.

Although embodiments of this invention have been disclosed, a worker of ordinary skill in this art would recognize that certain modifications would come within the scope of this invention. For that reason, the following claims should be studied to determine the true scope and content of this invention.

The invention claimed is:

1. A blade comprising:
an airfoil extending radially outwardly of a dovetail, said dovetail having edges that will be at circumferential sides of the blade when the blade is mounted within a rotor;
a bottom surface of the dovetail that will be radially inward when the blade is mounted in the rotor, and said bottom surface being formed such that a circumferentially central portion of said bottom surface is radially thicker than are circumferential edges;
said dovetail being formed of a material that is less strong than the rotor which will receive said blade;
wherein said dovetail merges directly into the airfoil without an intermediate platform; and
the bottom surface merging into radially outwardly extending surfaces, and then inwardly extending surfaces, and said bottom surface being formed to extend along a curve such that said circumferentially central portion is radially thicker than said circumferential edges.

2. A fan comprising:
a fan rotor having a plurality of slots, with said slots each receiving a fan blade;
the fan blades including an airfoil extending radially outwardly of a dovetail, said dovetail having edges at circumferential sides of the fan blade, a bottom surface of the dovetail defined at a radially inward location, and said bottom surface being formed such that a circumferentially central portion of said bottom surface is radially thicker than are circumferential edges;
said dovetail being formed of a material that is less strong than a material forming the fan rotor;
wherein said dovetail merges directly into the airfoil without an intermediate platform; and
the bottom surface merging into radially outwardly extending surfaces, and then inwardly extending surfaces, and said bottom surface being formed to extend along a curve such that said circumferentially central portion is radially thicker than said circumferential edges.

3. A gas turbine engine comprising:
a fan configured to deliver air into a compressor section;
a combustion section;
a turbine section;
said fan having a fan rotor with a plurality of slots, with said slots receiving a fan blade, and the fan blades including an airfoil extending radially outwardly of a dovetail, said dovetail having edges at circumferential sides of the fan blade, a bottom surface of the dovetail defined at an inward location, and said bottom surface being formed such that a circumferentially central portion of said bottom surface is radially thicker than are circumferential edges;
said dovetail being formed of a material that is less strong than a material forming the fan rotor;
a turbine rotor in said turbine section driving said fan through a gear reduction;
wherein said dovetail merges directly into the airfoil without an intermediate platform; and
the bottom surface merges into radially outwardly extending surfaces, and then inwardly extending surfaces, and said bottom surface being formed to extend along a curve such that said circumferentially central portion is radially thicker than said circumferential edges.

* * * * *